Nov. 10, 1942.    J. L. KOZAK ET AL    2,301,728
ELEVATOR BUCKET
Filed May 25, 1940
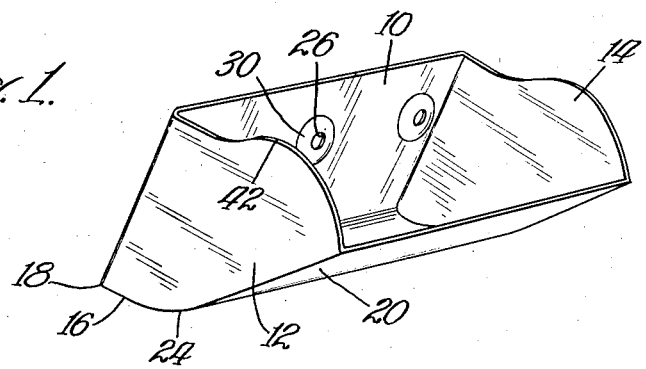
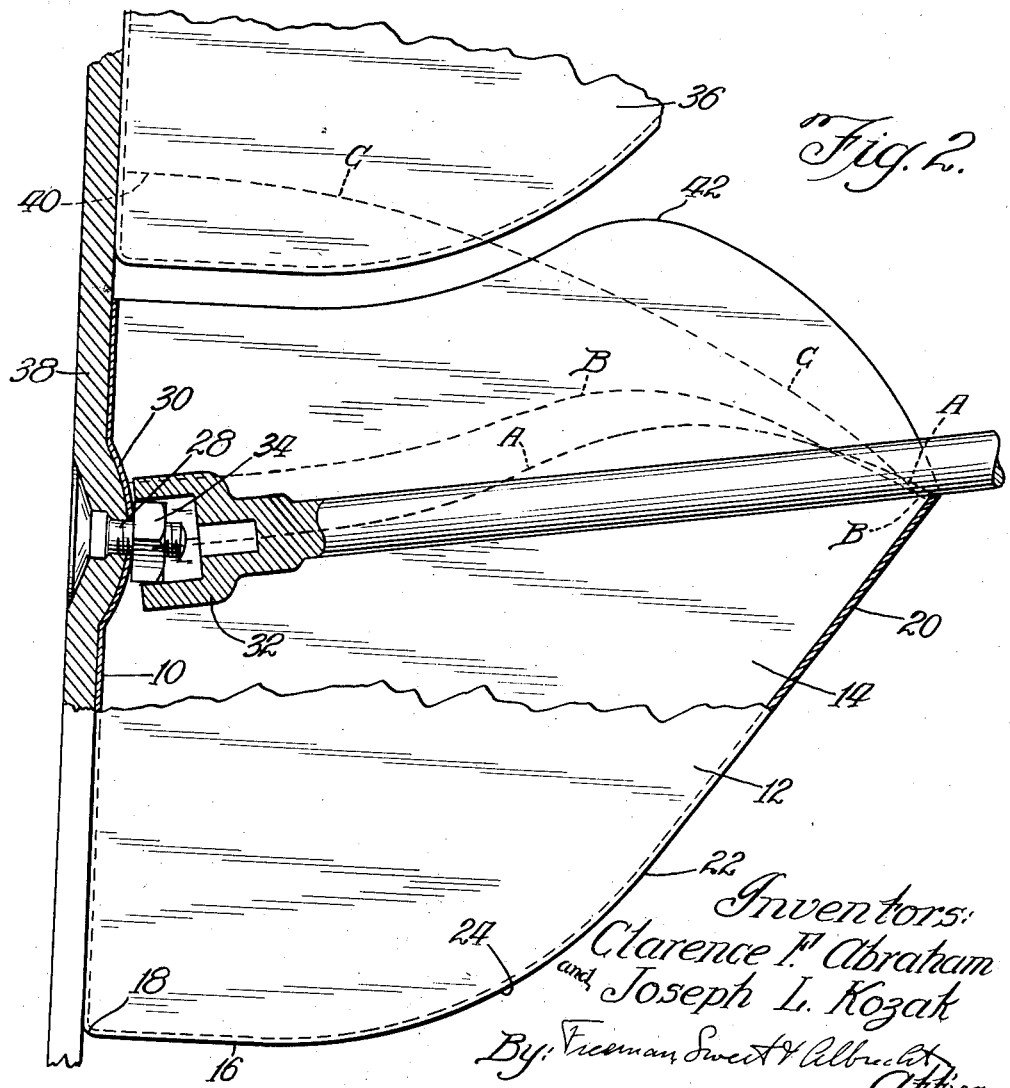
Inventors:
Clarence F. Abraham
and Joseph L. Kozak
By: Freeman, Sweet & Albrecht
Attys.

Patented Nov. 10, 1942

2,301,728

UNITED STATES PATENT OFFICE 2,301,728

ELEVATOR BUCKET

Joseph L. Kozak, Munster, Ind., and Clarence F. Abraham, Chicago, Ill., assignors to Screw Conveyor Corporation, Hammond, Ind., a corporation of Illinois Application May 25, 1940, Serial No. 337,144

4 Claims. (Cl. 198—152)

The invention relates to elevators and includes among its objects and advantages an improvement in the form of elevator buckets to produce a bucket having an increased range of operation at increased efficiency, in centrifugal discharge elevators.

Such buckets are employed extensively in grain elevators, but the grain elevator field is only a minor fraction of the market, inasmuch as they are used also in a great variety of industrial plants wherever bulk material needs to be elevated. Accordingly, while the following explanation will be with particular reference to the use of the invention in a grain elevator, it should be understood that the same considerations apply to the entire field of use of such buckets.

A centrifugal discharge elevator comprises a substantially vertical endless belt or flexible strand, passing over a head pulley at its highest point, and carrying a series of cup-shaped receptacles commonly called buckets, or cups, and traveling at a sufficient speed to cause the buckets as they pass over the head pulley, to throw their contents out by centrifugal force into a chute or receiving instrumentality located beside the downward path of the returning buckets.

It is possible to secure centrifugal discharge with centrifugal forces as small as half the force of gravity, but such low speeds are rarely used. With centrifugal force equal to gravity or greater, very reliable discharge can be secured. Speeds such that the centrifugal force is equal to, or at least not more than ten or twenty per cent greater than, gravity represent the common "low" speeds. Typical "high" speeds are with the centrifugal force from 150% to 200% or even 250% the force of gravity. At low speeds the contents of the bucket tends to leave the bucket shortly after the bucket reaches its highest point, substantially in a single mass, traveling in a parabolic path that diverges from the circular path of the bucket and thus separates the grain from the bucket. At high speeds the contents of the bucket slides out over the lip of the bucket a little at a time, beginning shortly after the bucket begins to travel in a curved path, and usually ending at some point between the highest point of travel and a point 45° farther around the pulley. Thus the material is sprayed out over the lip of the bucket and tends to occupy momentarily an involute curve extending outward and backward from the bucket lip. And as it is thrown horizontally and in part upwardly at high speed, a housing is required to confine and deflect the flying material into the discharge chute.

The use of a single bucket shape for a wide variety of speeds and pulley sizes is of advantage to the manufacturer by reducing the expense of maintaining dies and tools for producing a wide variety of shapes and sizes, and the expense of carrying on hand a large inventory to be able to fill orders promptly. For instance, a comprehensive stock of sizes and lengths in a bucket of a single type, logically requires 3" buckets in four different lengths, 4" buckets in six different lengths, and 5", 6", and 7" buckets in nine different lengths, making a total of 37 different sizes and shapes for a single bucket. Since the purchaser usually needs from 100 to 1,000 of such buckets to equip a leg, the problem of carrying stock on hand, even at the place of manufacture, assumes serious proportions. But this difficulty is many times multiplied by the fact that there are at present in more or less common use throughout the industry at least seven different types of buckets commonly referred to as Buffalo, Rialto, Salem, V, DP, O. K., and Calumet. Accordingly, to be able to fill orders promptly, the source of supply needs to carry not 37 different items but 259 items in quantities up to 1,000 buckets of each item.

But this is not all. The expense of dies and tools for producing such buckets renders it commercially difficult to locate bucket manufacturing equipment at more than two or three places throughout the country, and usually it is all at one place. But the users are widely scattered in all parts of the country. It is customary in the industry for a manufacturer to arrange to have stock carried on hand, as by jobbers, in from 20 to 50 commercial centers throughout the country so that the needs of the users can be promptly met.

Accordingly, it will be evident that the expense of carrying stock on hand at distributing points is such a serious burden to the jobber, as well as the manufacturer, that the prevailing price of buckets to the user is materially enhanced by the use of so many different designs of buckets.

In the accompanying drawing:

Figure 1 is a perspective view of a bucket according to the invention; and

Figure 2 is a fragmentary end elevation partly in section of a series of buckets on a belt, and is substantially a scale drawing of correct proportions.

In the embodiment of the invention selected for illustration, the bucket includes a substantially plane back wall 10, end walls 12 and 14, and a bottom and front wall. The bottom and front wall includes a horizontal portion 16 adjacent the back wall and joining the bottom edge of the same to form a sharp heel at 18, and an inclined front, or lip, 20 substantially plane down to a point of tangency at 22 with an arcuate portion at 24, which arcuate portion is also tangent to the bottom portion 16.

The bolt holes at 26 for receiving the bolts 28 for fastening the bucket to a belt 38 or the like are below the level of the outer edge of the lip 20. The elevators in which such buckets are used are frequently built in such ways that it is necessary to tighten up the fastening bolts from in front. The bosses 30 are substantially spherical and accomplish three functions. First, they strengthen the back at the points where the bolts take hold. Second, they curve enough to leave clearance that will let the head 32 of a socket wrench get an effective grip on the nut, or bolt head, 34, although the wrench has to be a little out of true alignment with the bolt. And third, they define a pocket into which the belt is pulled by the bolt, and the combined resilience of the belt and the boss keeps the nut tight and prevents it from working loose.

The orientation of the plane of the lip has a bearing on the action of the bucket in service. This is usually stated by stating the angle between the plane of the lip and a plane parallel to the back and passing through the outer edge of the lip. The angle of the lip 20 in the drawing is 35°. Angles from 20° to 40° will work well under most conditions, but 35° represents about the best compromise between the different factors involved. With a much smaller angle the breast of the bucket at 22 tends to get in the way of grain entering the following bucket, and with a larger angle there is a tendency for an outer fraction of grain lying along the edge of the lip 20 to discharge too soon as the bucket starts around the head pulley.

The horizontal distance from the belt out to the edge of the lip is called the "projection" of the bucket, and it is convenient to express other dimensions by comparison with such projection. We have found that if the lip 20 is plane for a distance of at least 20% of the projection, measured along the lip, there is a cleaner discharge. We believe this is because, at the time the last of the grain is leaving the bucket, the grain still in the bucket is in a thin layer pressing outwardly against the lip 20, and the flat lip tends to let this grain slide along the lip, instead of tumbling over and over, as it might if the lip were concave.

Back of the lip itself, the contour of the bottom of the bucket becomes relatively less significant. Specifically, the substitution of one or more chords for the arcuate portion 24 can readily be detected by inspection of the bucket itself, but such a bucket has most of the advantages of the bucket disclosed.

The carrying of a full capacity load in such buckets is chiefly a problem of loading at the bottom, although limitations are imposed by the necessity of having the bucket discharge cleanly at the top. In practice at different speeds, different degrees of filling will be obtained, of the types indicated by the dotted lines A, B, and C. At relatively slow linear speeds there is time for free flowing grain fed to the bucket to fill in up to the curve C, where the grain is either packed against the bottom of the preceding bucket, indicated at 36, or lies up against the belt 38 a little at 40 if the preceding bucket is farther away. At higher speeds there will not be time for that much grain to flow in and some such curve as B will represent the surface of the grain in the bucket. With properly designed boots it appears to be possible to do at least as well as curve B, even at top speeds, but if the boot is designed poorly, insufficient filling such as indicated by curve A may result at high speeds.

In any event, the only practical significance to be attached to the height to which the back extends, would seem to be that it limits the minimum spacing of the buckets because it is impractical to let the buckets touch and rub on each other at centrifugal discharge speeds. The back must also extend far enough below the bolts to carry the load of the bucket and its contents, and far enough above the bolts to carry the load of the empty descending bucket, without putting too much tension on the bolts, which might break the bolts, or the back of the bucket where it engages the bolts.

By locating the bolts below the lip, as disclosed, it is possible to have the lip materially higher above the heel 18, and at the same time leave the upper edge of the back as low as shown.

It has been customary in the past to estimate the capacity of buckets in use by figuring the volume enclosed up to an imaginary "strike line" passing through the lip and the top of the back. Then the actual performance was ascertained, and the ratio of performance to strike line capacity was called "efficiency." Consideration of the curves A, B, and C indicates that such efficiencies are entirely fictitious, inasmuch as extending the back of the disclosed bucket to a higher point would not result in any change in capacity.

To secure a more appropriate index of efficiency, it is noted that at the speeds used to get high capacity, curves similar to B are usually obtained, and such curves differ but little in average height from a horizontal line running back from the lip. One method of making comparisons of buckets of different cross-sectional contour and area as represented by their end shapes or areas (which are of course direct volume or capacity factors) is to find for each bucket the ratio between its end area and the square of its horizontal strike line or projection, and also the ratio between said end area and the square of the bucket height (as represented by the lineal space it takes up on the elevator belt). This affords a fairly practical basis for an approximately correct comparison of the relative efficiency or operating capacities of buckets of different shapes as regards both projection and height. Various methods may be used to obtain the ratios referred to, as by tracing the end areas upon cross-section paper to obtain a count representing the area to compare with the square of the projection or of the bucket height. Measured with a horizontal "strike line," the bucket of the invention has an end area equal to 50.3% of a square having the bucket projection as one side, and equal to 65.2% of a square having the bucket height as one side. When the buckets are closely spaced, the latter figure is a substantially true index of efficiency, and is about 130% of the efficiency of the most efficient close-spaced high speed bucket of the prior art known to us, referred to as the Calumet. When the buckets are not closely spaced, the projection efficiency is a substantially true index and is about 111% of the efficiency of the most efficient wide spaced high speed bucket of the prior art known to us, referred to as the Salem bucket.

We are aware that buckets with a projection efficiency as high as 72% have been used, but they have lips at an angle of about 8° and can not be depended on to operate closely spaced or discharge cleanly at speeds such that the centrifugal force in going over the head pulley is much greater than about one and one half times gravity. In referring to high speed buckets, we intend to include only buckets which will discharge well at speeds such that the centrifugal discharge force is as much as twice gravity, or even more, and in referring to close spaced buckets we intend to include buckets which can function successfully when mounted with at least as little as one half inch clearance between successive buckets.

The end plates 12 and 14 are identical, and their upper edges extend rearwardly and upwardly from the lip 20, as shown in the drawing, to a maximum at 42, at which point they are very close to the bottom of the preceding bucket 36, if the buckets are closely spaced. Back of the point 42 the upper edges of the sides follow a concave line generally parallelling the convex exterior of the bottom of the preceding bucket. Thus, when the buckets are closely spaced, the end walls constitute an almost continuous barrier out to the point 42. Beyond that point the incoming grain meets an endless series of open mouthed chutes lying at a 35° angle and defined by substantially straight top and bottom walls. But at the top and bottom, the curvature of the belt over the pulley tips the buckets away from each other a little, so that the openings are a little larger than while the buckets are rising on a straight belt.

The bucket disclosed has a higher height efficiency than any earlier bucket known to us, regardless of speed, and a higher projection efficiency than any earlier high speed bucket known to us. It will load and discharge cleanly at the lowest speeds at which it is possible to secure centrifugal discharge, and up to speeds as high as any. And at speeds where the descending reach of belt is inclined or the contents of one bucket are guided in whole or in part by sliding off the back of the bucket ahead, the bucket disclosed will also function well.

Without further elaboration, the foregoing will so fully explain our invention, and indicate the range of variations within which the advantages of the invention may be realized, that others may, by applying knowledge current at the time of application, readily adapt the same for use under various conditions of service.

We claim:

1. An elevator bucket having a vertical back and ends; and a front and bottom portion connecting said ends and comprising a horizontal portion connected with the lower edge of said back and a plane or flat lip portion projecting a predetermined distance from said back and terminating in an edge or lip slightly below the level of the upper edge of said back, and an intermediate curved portion in tangential relation to both said horizontal and lip portions; said flat lip portion lying at an angle of substantially thirty-five degrees to said back; said ends projecting above said edge or lip and having their upper edges extending horizontally from said back and thence upwardly and finally downward to said lip for conforming the tops and bottoms of adjacent buckets and approximately closing the space therebetween and also forming chute passages into the buckets at an angle of thirty-five degrees to said back.

2. A sheet-metal bucket adapted for operation at speeds such that the centrifugal force of discharge is greater than gravity comprising, in combination: a closed vertical back and ends; a bottom and lip portion terminating in a substantially plane lip lying at an angle of substantially 35° to vertical; the upper edge of said lip lying at a predetermined distance away from said back; said back having its upper edge slightly above the upper edge of said lip; the upper edges of said ends meeting the upper edge of said lip to define corners; the upper edges of said ends rising rapidly back of said corners to at least the level of the upper edge of said back; the upper edges of said ends adjacent said back being shaped to conform to the outer surface of an adjacent closely spaced bucket to define a space substantially closed along the ends and back, into which space a chute enters at an angle of substantially 35° to said back; said chute being defined by the bucket lip and the portions of the bucket ends adjacent said lip.

3. A bucket elevator adapted for operation at speeds such that the centrifugal force of discharge is greater than gravity and including a belt; a series of buckets attached to said belt; each bucket comprising: a closed vertical back and ends; a bottom and lip portion terminating in a substantially plane lip lying at an angle of substantially 35° to vertical; the upper edge of said lip lying at a predetermined distance away from said back; said back having its upper edge slightly above the upper edge of said lip; the upper edges of said ends meeting the upper edge of said lip to define corners and being shaped to conform to the outer surface of an adjacent closely spaced bucket to define a space substantially closed along the ends and back; the bucket lip and the portions of the bucket ends adjacent said lip defining a chute passage entering said closed space at an angle of substantially 35° to said back.

4. An elevator bucket having a vertical back and ends; and a front and bottom portion connecting said ends and comprising a horizontal portion connected with the lower edge of said back and a plane or flat lip portion projecting a predetermined distance from said back and terminating in an edge or lip slightly below the level of the upper edge of said back, and an intermediate curved portion in tangential relation to both said horizontal and lip portions; said flat lip portion lying at an angle of substantially thirty-five degrees to said back; said ends projecting above said edge or lip and having upper edges shaped for conforming the tops and bottoms of adjacent buckets and approximately closing the space therebetween and also forming chute passages into the buckets at an angle of thirty-five degrees to said back.

JOSEPH L. KOZAK.
CLARENCE F. ABRAHAM.